(12) United States Patent
Biebricher et al.

(10) Patent No.: US 10,718,640 B2
(45) Date of Patent: Jul. 21, 2020

(54) SENSOR ELEMENT FOR A MOTOR VEHICLE

(71) Applicant: Continental Teves AG & Co. oHG, Frankfurt (DE)

(72) Inventors: Lothar Biebricher, Oberursel (DE); Marco Benner, Biedenkopf-Wallau (DE); Jakob Schillinger, Gaimersheim (DE); Dietmar Huber, Rödermark (DE); Thomas Fischer, Frankfurt am Main (DE); Stefan Günthner, Frankfurt am Main (DE); Michael Schulmeister, Groß-Zimmem (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/092,048

(22) PCT Filed: Mar. 27, 2017

(86) PCT No.: PCT/EP2017/057193
§ 371 (c)(1),
(2) Date: Oct. 8, 2018

(87) PCT Pub. No.: WO2017/190889
PCT Pub. Date: Nov. 9, 2017

(65) Prior Publication Data
US 2019/0113370 A1 Apr. 18, 2019

(30) Foreign Application Priority Data
May 3, 2016 (DE) .......................... 10 2016 207 664

(51) Int. Cl.
*H05K 5/00* (2006.01)
*G01D 11/24* (2006.01)
(Continued)

(52) U.S. Cl.
CPC ...... *G01D 11/245* (2013.01); *B29C 45/14073* (2013.01); *B29C 45/1671* (2013.01); *B29K 2101/12* (2013.01); *B29L 2031/3481* (2013.01)

(58) Field of Classification Search
USPC .................................. 361/752, 728, 796, 800
See application file for complete search history.

(56) References Cited

U.S. PATENT DOCUMENTS

| 6,334,361 | B1 | 1/2002 | De Volder et al. | |
|---|---|---|---|---|
| 7,269,992 | B2 * | 9/2007 | Lamb ..................... | G01D 5/147 324/202 |

(Continued)

FOREIGN PATENT DOCUMENTS

| DE | 19612765 A1 | 11/1997 |
|---|---|---|
| DE | 102007060604 A1 | 6/2009 |

(Continued)

OTHER PUBLICATIONS

German Search Report for German Application No. 10 2016 207 664.7, dated Feb. 22, 2017 with partial translation, 9 pages.

(Continued)

*Primary Examiner* — Hung S. Bui
(74) *Attorney, Agent, or Firm* — RatnerPrestia

(57) ABSTRACT

A sensor element for a motor vehicle, includes a sensor circuit for detecting a physical variable, a first housing, in which the sensor circuit is arranged, a second housing, in which the first housing is arranged, a thermoplastic, which at least partially encloses the first housing and fixes the first housing in the second housing in a positioning position, at least two positioning recesses for receiving positioning pins being formed in the first housing in order to fix the first housing in the positioning position while the first housing is being enveloped by the thermoplastic.

16 Claims, 3 Drawing Sheets

(51) Int. Cl.
*B29C 45/14* (2006.01)
*B29C 45/16* (2006.01)
*B29K 101/12* (2006.01)
*B29L 31/34* (2006.01)

(56) References Cited

U.S. PATENT DOCUMENTS

| | | | |
|---|---|---|---|
| 8,286,469 B2 | 10/2012 | Karrer et al. | |
| 8,575,924 B2 | 11/2013 | Gruber et al. | |
| D761,745 S * | 7/2016 | Shinkai | D13/182 |
| 9,661,775 B2 | 5/2017 | Schillinger et al. | |
| 9,961,779 B2 | 5/2018 | Biebricher et al. | |
| 9,964,603 B2 | 5/2018 | Schrader et al. | |
| 10,383,240 B2 * | 8/2019 | Hunter | H05K 5/0217 |
| 2010/0244318 A1 | 9/2010 | Kobayashi et al. | |
| 2012/0043131 A1 | 2/2012 | Christov et al. | |
| 2016/0061642 A1 * | 3/2016 | Arai | B29C 66/53462 73/273 |
| 2016/0297122 A1 * | 10/2016 | Fischer | B29C 45/1671 |
| 2017/0146369 A1 | 5/2017 | Schillinger et al. | |
| 2017/0165885 A1 | 6/2017 | Goll et al. | |

FOREIGN PATENT DOCUMENTS

| | | |
|---|---|---|
| DE | 102009008457 A1 | 8/2010 |
| DE | 102010003554 A1 | 1/2011 |
| DE | 102013202212 | 8/2013 |
| DE | 102013214915 A1 | 1/2014 |
| DE | 102012217618 A1 | 3/2014 |
| DE | 102012223982 | 6/2014 |
| DE | 102014212720 A1 | 1/2015 |
| DE | 102013224466 A1 | 5/2015 |
| DE | 102014213591 A1 | 1/2016 |
| DE | 102014213588 A1 | 2/2016 |
| DE | 102015208315 A1 | 11/2016 |
| DE | 102015208319 A1 | 11/2016 |
| EP | 1634687 A1 | 3/2006 |
| EP | 2211396 A2 | 7/2010 |
| EP | 2122784 B1 | 1/2014 |
| FR | 2556645 A1 | 6/1985 |
| JP | 2003142510 A | 5/2003 |
| JP | 2008093957 A | 4/2008 |
| JP | 2012228865 A | 11/2012 |
| JP | 2014065176 A | 4/2014 |
| JP | 2015136872 A | 7/2015 |
| WO | 2015078958 A1 | 6/2015 |

OTHER PUBLICATIONS

International Search Report and Written Opinion for International Application No. PCT/EP2017/057193, dated Jun. 1, 2017, 8 pages.
Korean Office Action for Korean Application 10-2018-7031722, dated Jun. 27, 2019, with translation, 12 pages.

* cited by examiner

SENSOR ELEMENT FOR A MOTOR VEHICLE

CROSS REFERENCE TO RELATED APPLICATIONS

This application is the U.S. National Phase Application of PCT International Application No. PCT/EP2017/057193, filed Mar. 27, 2017, which claims priority to German Patent Application No. 10 2016 207 664.7, filed May 3, 2016, the contents of such applications being incorporated by reference herein.

FIELD OF THE INVENTION

The invention relates to a sensor element for a motor vehicle, comprising a sensor circuit for detecting a physical variable, a first housing, in which the sensor circuit is arranged, a second housing, in which the first housing is arranged, and a thermoplastic, which at least partially encloses the first housing and fixes the first housing in the second housing in a positioning position.

BACKGROUND OF THE INVENTION

The overmolding of active electronic components such as sensors of various functions and structural designs is known in the prior art. Depending on the function and construction, the sensors have different sensitivities with regard to thermomechanical loading during the production process. Usually, such sensor elements are provided with carrier components, which can be encapsulated by means of additional seals.

SUMMARY OF THE INVENTION

An aspect of the present invention aims to overcome the disadvantages from the prior art and to provide a sensor element and a method for producing a sensor element that considerably improves the positioning accuracy of a sensor element and at the same time obviates the need for using carrier components and sensor elements.

According to one aspect of the invention, a sensor element for a motor vehicle comprises a sensor circuit for detecting a physical variable, a first housing, in which the sensor circuit is arranged, a second housing, in which the first housing is arranged, and a thermoplastic, which at least partially encloses the first housing and fixes the first housing in the second housing in a positioning position, at least two positioning recesses for receiving positioning pins being formed on the first housing in order to fix the first housing in the positioning position while the first housing is being enveloped by the thermoplastic. This achieves the technical advantage for example that it is possible to dispense with a carrier component for the sensor element. Doing away with the carrier component, and having a consequently reduced tolerance chain, allows the positioning accuracy of the sensor element to be improved considerably. Doing away with the carrier component obviates the need for an additional assembly and disassembly process, whereby necessary investments are significantly reduced.

In order to fix the sensor element as far as possible in an X, Y and Z direction during the encapsulation by means of positioning pins, the first housing has a housing underside and a housing upper side, facing away from the housing underside, a first positioning recess being formed on the housing underside, a second positioning recess being formed on the housing upper side, and the positioning recesses being arranged opposite one another.

In order to additionally improve the fixing of the sensor element during the encapsulation, a further positioning recess is formed on the first housing alongside one of the positioning recesses for receiving a further positioning pin.

According to a preferred embodiment, the positioning recesses are at least partially closed by the thermoplastic. This achieves the technical advantage for example that, instead of the mechanical fixing by the positioning pins, there is an interlocking and frictionally engaging fixing of the sensor element by means of the hardened thermoplastic. The closing of the positioning recesses additionally improves the frictional engagement between the plastic and the sensor element. However, it is alternatively conceivable that positioning pins that are at least partly enveloped by the thermoplastic are arranged in the positioning recesses. This achieves the technical advantage in particular that the positioning pins no longer have to be removed, but can remain in the sensor element, enclosed by the plastic.

For easier assembly and to improve the functionality, the sensor circuit comprises a lead frame, which is at least partly housed by the first housing.

According to a further preferred embodiment, the sensor element comprises a state sensor for detecting a state of the thermoplastic, in particular during the introduction of the thermoplastic between the first housing and the second housing, the state being at least one of the state's pressure, temperature, viscosity, flow rate or flow front profile. This achieves the technical advantage for example that a precise control of the production of the sensor element is possible. By detecting the state of the thermoplastic, a precise point in time for withdrawing the positioning pins can be established.

To allow an operating range of the sensor element that is as great as possible in the application area of a motor vehicle, the physical variable is at least one of the variables velocity, acceleration, rate of rotation, pressure, temperature or direction and intensity of a magnetic field. Here, the sensor element may for example be designed for allowing the calculation of a velocity, a rotational speed, a position and a current on the basis of a detected direction and a detected intensity of a magnetic field.

In order to design the first housing to be as simple and expedient as possible, the first housing is formed from a thermosetting plastic.

According to a further preferred embodiment, the thermoplastic is a partially crystalline high-performance thermoplastic. This achieves the technical effect for example that the thermoplastic has a coefficient of thermal expansion that is as low as possible, along with a relatively high chemical resistance, mechanical strength and impermeability. Alternatively, the thermoplastic may however also be replaced by a thermosetting or elastomeric plastic. This depends in particular on the specific requirements for the sensor element.

In order to insert the positioning pins into the second housing before the introduction of the thermoplastic for fixing the first housing and in order to withdraw the positioning pins again from the second housing while the thermoplastic is being introduced, apertures that can be passed through by the positioning pins are formed in the second housing in line with the positioning recesses of the first housing.

In order to design the second housing to be as simple as possible and make the detection of the state of the thermoplastic by the state sensor as easy as possible, the second housing is closed off at the end face.

In order to additionally improve the fixing of the sensor element with the aid of positioning pins during the encapsulation, the positioning recesses have a triangular, oval, circular or polygonal cross section.

According to a further aspect of the invention, a method for producing a sensor element for a motor vehicle comprises the steps of providing a sensor circuit for detecting a physical variable, the sensor circuit being arranged in a first housing, at least two positioning recesses for receiving positioning pins being formed on the first housing, inserting the first housing into a second housing, which has apertures that can be passed through by the positioning pins, fixing the first housing in the second housing by the positioning pins that pass through the apertures of the second housing and are inserted in the positioning recesses, and introducing flowable thermoplastic into the second housing in order to envelop the first housing, the first housing being fixed in the second housing by the positioning pins while the thermoplastic is being introduced. This achieves the technical advantage in particular that it is possible to dispense with a carrier component for the sensor element. Doing away with the carrier component, and having the consequently reduced tolerance chain, allows the positioning accuracy of the sensor element to be improved considerably. Doing away with the carrier component obviates the need for an additional assembly and disassembly process, whereby necessary investments are significantly reduced.

According to a preferred embodiment, the positioning pins are withdrawn or pulled out before the thermoplastic reaches the positioning pins.

BRIEF DESCRIPTION OF THE DRAWINGS

Further exemplary embodiments of aspects of the invention are illustrated in the drawings and will be explained in more detail hereafter.

In the drawings.

DETAILED DESCRIPTION OF THE PREFERRED EMBODIMENTS

Figure 1:
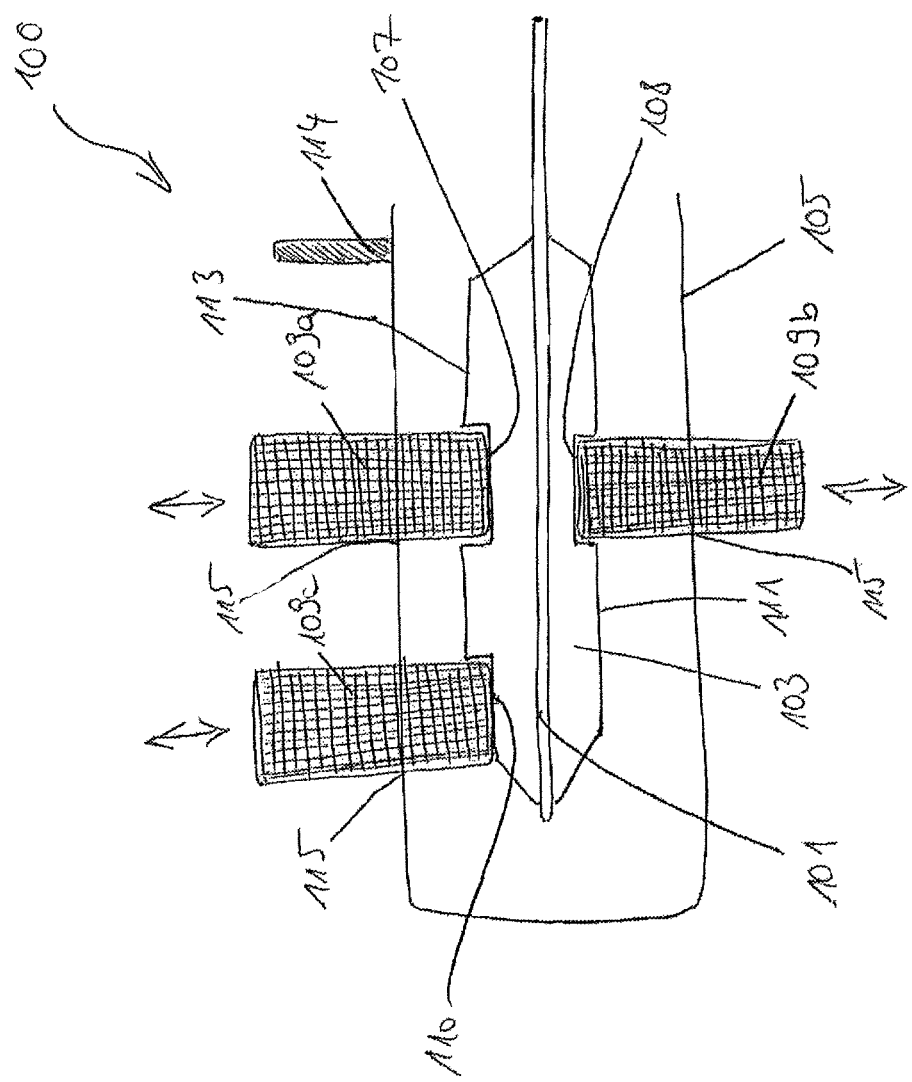
FIG. 1 shows a schematic representation of a sensor element.

FIG. 1 shows a schematic representation of a sensor element 100 for a motor vehicle with a sensor circuit 101, which is arranged in a first housing 103. The first housing 103 has an upper side 113 and an underside 111. The sensor element 100 comprises a second housing 105, in which the first housing 103 is arranged. Arranged on the first housing 103 are three positioning recesses 107, 108, 110, which receive positioning pins 109a, 109b, 109c. The positioning pins 109a, 109b, 109c fix the sensor circuit 101 including the first housing 103.

In addition, the sensor element 100 comprises a state sensor 114, in order to detect a state of the thermoplastic 106 (not shown) that is introduced between the first housing 103 and the second housing 105.

Furthermore, the sensor element 100 comprises apertures 115, arranged in the second housing 105, for each positioning pin 109a, 109b, 109c. These are formed in line with the positioning recesses 107, 108, 110 of the first housing 103.

Consequently, the positioning pins 109a, 109b, 109c can be inserted into the second housing 105 and used for fixing the first housing 103.

In the representation according to FIG. 1, there is not yet any thermoplastic 106 between the first housing 103 and the second housing 105. Consequently, the first housing 103 is fixed exclusively by the positioning pins 109a, 109b, 109c, the positioning pins 109a, 109b, 109c engaging in the positioning recesses 107, 108, 110.

The state sensor 114 for detecting the state of the thermoplastic 106 is located on the second housing 105. The state sensor 114 can ensure precise control of the point in time for withdrawing the positioning pins 109a, 109b, 109c. In the present case, the state sensor 114 cannot detect that any thermoplastic 106 has been introduced. Consequently, all of the positioning pins 109a, 109b, 109c remain in engagement in the positioning recesses 107, 108, 110 of the first housing 103.

Figure 2:
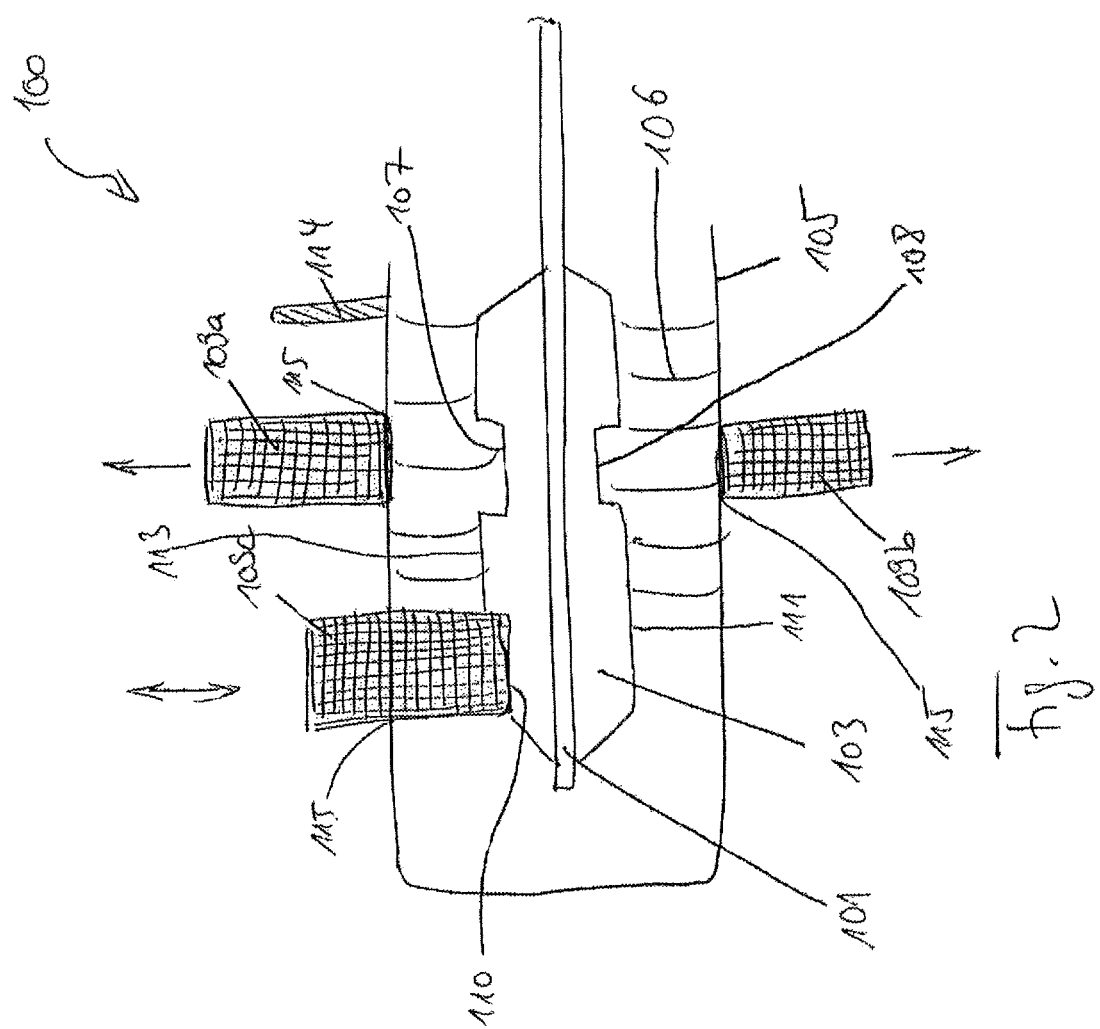
FIG. 2 shows a further schematic representation of a sensor element.

FIG. 2 shows a further schematic representation of a sensor element 100. Two positioning pins 109a, 109b of the altogether three positioning pins 109a, 109b, 109c are in a state of having been withdrawn from the second housing 105. The thermoplastic 106 has already been partially introduced between the first housing 103 and the second housing 105, whereby the thermoplastic 106 introduced partially undertakes the fixing of the two withdrawn positioning pins 109a, 109b.

The state sensor 114 can then detect that a certain amount of thermoplastic 106 has been introduced in a certain state. Consequently, two positioning pins 109a, 109b have been withdrawn, while one positioning pin 109c has remained in engagement in the positioning recess 110 of the first housing 103.

Figure 3:
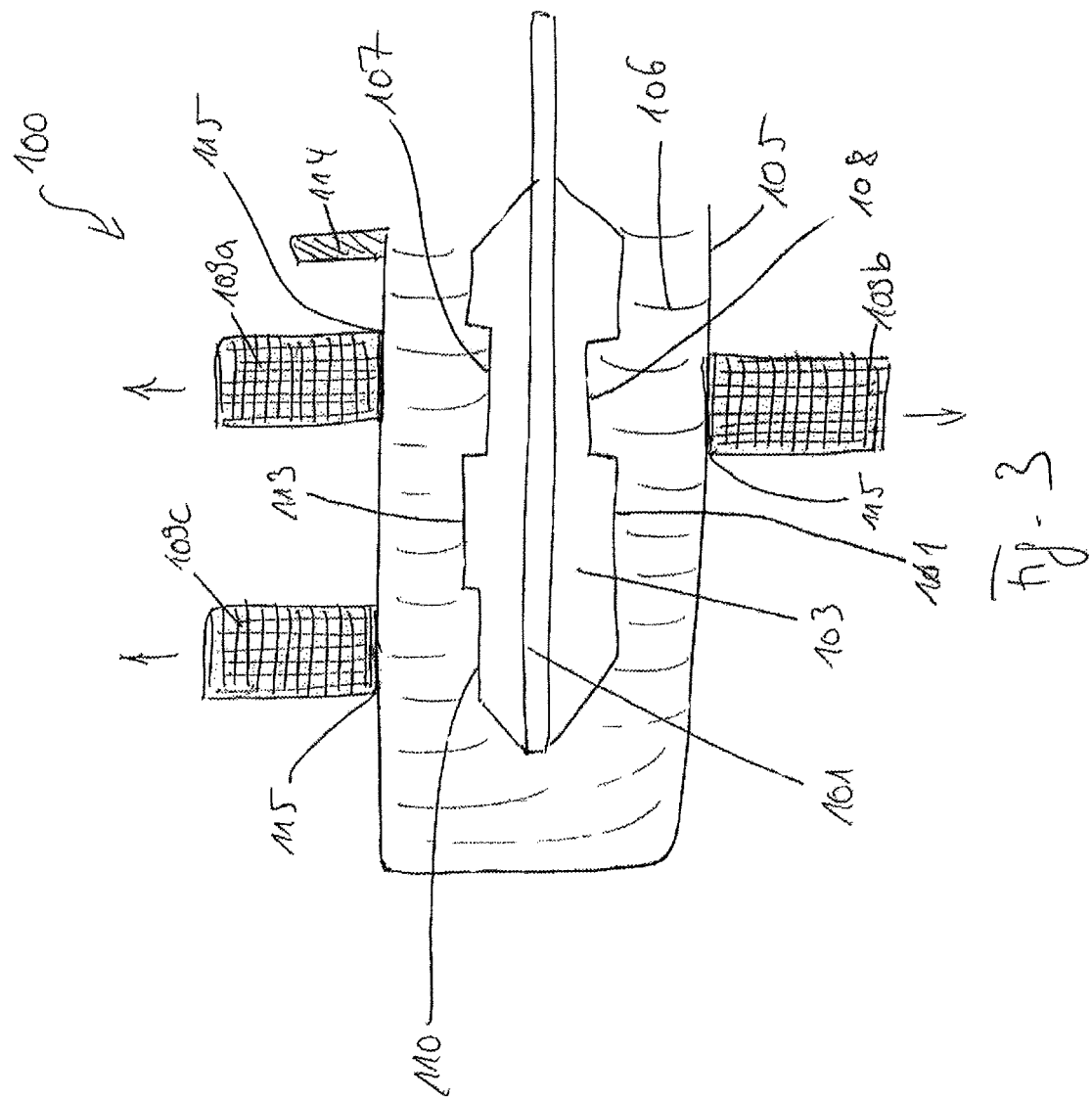
FIG. 3 shows a still further schematic representation of a sensor element.

FIG. 3 shows a still further schematic representation of a sensor element 100. All three positioning pins 109a, 109b, 109c are in a state of having been withdrawn from the second housing 105. The thermoplastic 106 has already been introduced completely between the first housing 103 and the second housing 105, whereby the thermoplastic 106 introduced completely undertakes the fixing of the three positioning pins 109a, 109b, 109c.

All the features that have been explained and shown in the context of individual embodiments of aspects of the invention can be provided in various combinations in the subject matter according to aspects of the invention in order for the advantageous effects of said features to be implemented simultaneously.

LIST OF REFERENCE NUMERALS

101 Sensor circuit
103 First housing
105 Second housing
106 Thermoplastic
107 Positioning recess
108 Positioning recess
109a Positioning pin
109b Positioning pin
109c Positioning pin
110 Positioning recess
111 Housing underside
113 Housing upper side
114 State sensor

The invention claimed is:
1. A sensor element for a motor vehicle, comprising:
a sensor circuit for detecting a physical variable;

a first housing formed from a continuous piece of material which houses the sensor circuit;

a second housing, in which the first housing is arranged, the second housing being formed from plastic, the second housing at least partially enclosing the first housing and fixing the first housing in the second housing in a positioning position; and at least two positioning recesses for receiving positioning pins being formed on the continuous piece of material of the first housing in order to fix the first housing in the positioning position while the first housing is being enveloped by the plastic of the second housing, wherein the second housing comprises apertures in line with the at least two positioning recesses of the first housing, the apertures configured to surround the positioning pins received in the at least two positioning recesses.

2. The sensor element as claimed in claim 1, the first housing having a housing underside and a housing upper side, facing away from the housing underside, a first positioning recess being formed on the housing underside, a second positioning recess being formed on the housing upper side, and the positioning recesses being arranged opposite one another.

3. The sensor element as claimed in claim 2, the positioning recesses being at least partially closed by the thermoplastic, or the positioning pins that are at least partly enveloped by the thermoplastic being arranged in the positioning recesses.

4. The sensor element as claimed in claim 2, a further positioning recess being formed on the first housing alongside one of the positioning recesses for receiving a further positioning pin.

5. The sensor element as claimed in claim 1, a further positioning recess being formed on the first housing alongside one of the positioning recesses for receiving a further positioning pin.

6. The sensor element as claimed in claim 1, the sensor circuit comprising a lead frame, which is at least partly housed by the first housing.

7. The sensor element as claimed in claim 1, further comprising a state sensor for detecting a state of the thermoplastic, during the introduction of the thermoplastic between the first housing and the second housing, the state being selected from the group consisting of: a pressure, a temperature, a viscosity, a flow rate, and a flow front profile.

8. The sensor element as claimed in claim 1, the physical variable selected from the group consisting of: a velocity, an acceleration, a rate of rotation, a pressure, a temperature, a direction and an intensity of a magnetic field.

9. The sensor element as claimed in claim 1, the first housing being formed from a thermosetting plastic.

10. The sensor element as claimed in claim 1, the thermoplastic being a partially crystalline high-performance thermoplastic.

11. The sensor element as claimed in claim 1, the second housing being closed off at the end face.

12. The sensor element as claimed in claim 1, the positioning recesses having a triangular, oval, circular or polygonal cross section.

13. The sensor element as claimed in claim 1, wherein the second housing is formed from a thermoplastic.

14. The sensor element as claimed in claim 1, wherein the at least two positioning recesses are at least partially closed by the positioning pins received in the at least two positioning recesses, the positioning pins being at least partly enveloped by the second housing.

15. A method for producing a sensor element for a motor vehicle, comprising:

providing a sensor circuit for detecting a physical variable, the sensor circuit being housed in a first housing formed from a continuous piece of material, at least two positioning recesses for receiving positioning pins being formed on the continuous piece of material of the first housing;

inserting the first housing into a second housing, which has apertures that can be passed through by the positioning pins, fixing the first housing in the second housing by the positioning pins that pass through the apertures of the second housing and are inserted in the positioning recesses; and introducing flowable thermoplastic into the second housing in order to envelop the first housing, the first housing being fixed in the second housing by the positioning pins while the thermoplastic is being introduced, wherein the second housing comprises apertures in line with the at least two positioning recesses of the first housing, the apertures configured to surround the positioning pins received in the at least two positioning recesses.

16. The method as claimed in claim 15, the positioning pins being withdrawn or pulled out before the thermoplastic reaches the positioning pins.

* * * * *